March 22, 1955    C. O. THOMPSON ET AL    2,704,566
FIXTURE FOR MOUNTING STEREOSCOPIC TRANSPARENCIES
Filed May 27, 1953      3 Sheets-Sheet 1
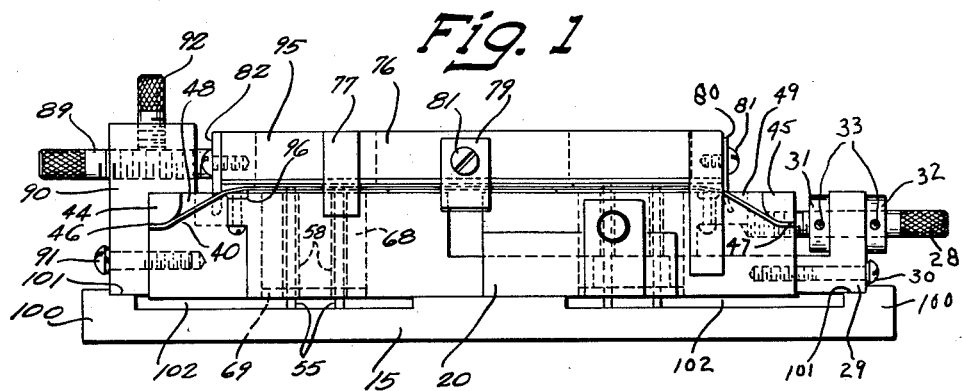
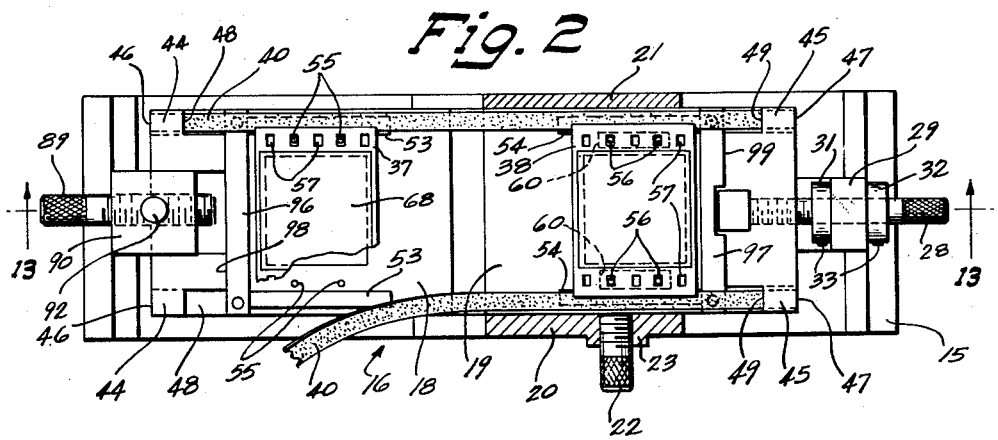
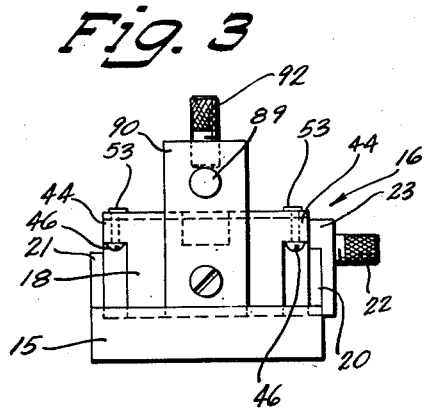
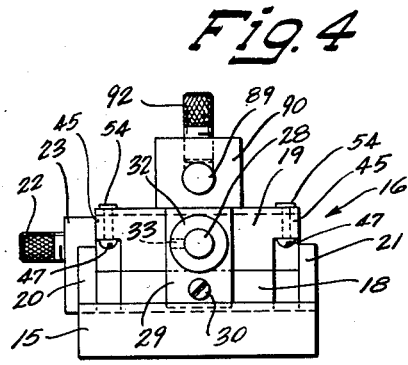
INVENTORS
Clinton O. Thompson
Selma C. Thompson
BY
Cyril M. Hajewski
Attorney March 22, 1955     C. O. THOMPSON ET AL     2,704,566
FIXTURE FOR MOUNTING STEREOSCOPIC TRANSPARENCIES
Filed May 27, 1953     3 Sheets-Sheet 2
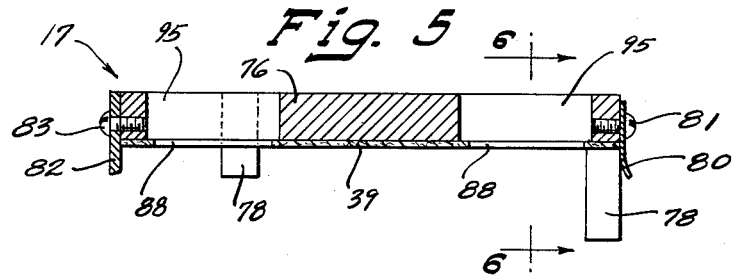
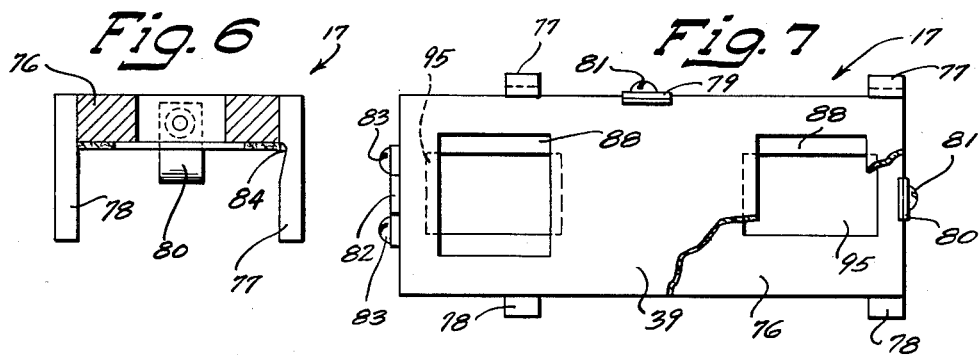
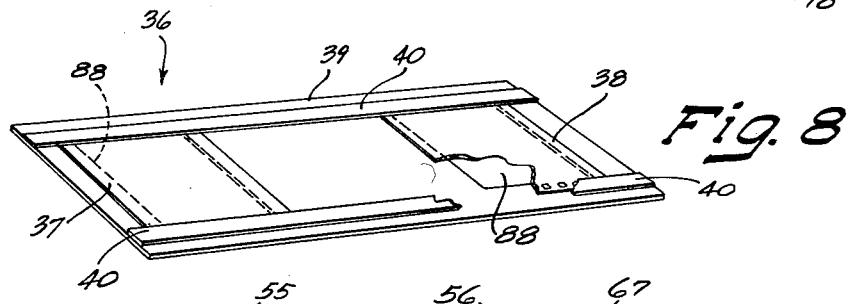
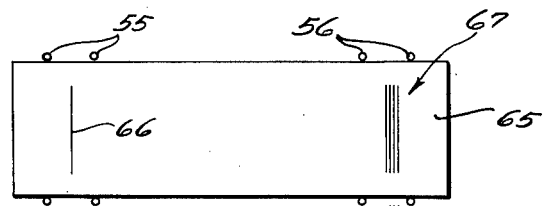
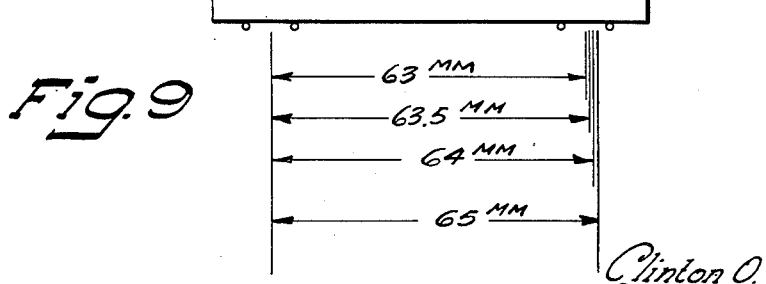
INVENTORS
Clinton O. Thompson
Selma C. Thompson
BY
Cyril M. Hajewski
Attorney March 22, 1955  C. O. THOMPSON ET AL  2,704,566
FIXTURE FOR MOUNTING STEREOSCOPIC TRANSPARENCIES
Filed May 27, 1953  3 Sheets-Sheet 3

INVENTORS
Clinton O. Thompson
Selma C. Thompson
BY
April M. Hajewski
Attorney

United States Patent Office 2,704,566
Patented Mar. 22, 1955

2,704,566

FIXTURE FOR MOUNTING STEREOSCOPIC TRANSPARENCIES

Clinton O. Thompson and Selma C. Thompson, Cudahy, Wis.

Application May 27, 1953, Serial No. 357,732

17 Claims. (Cl. 154—1.6)

This invention relates generally to a picture mounting fixture, and more particularly to an improved fixture for accurately mounting stereoscopic transparencies on a slide for use with either a stereoscopic viewer or projector.

In stereoscopic photography, a special camera is utilized which is actually two cameras combined for simultaneous operation, to take two pictures of the subject. The respective lenses of these two cameras are spaced approximately the same distance apart as the spacing of the eyes of a human being, which is found to be approximately 65 millimeters. When the camera is actuated, two pictures are taken of the subject, and since the lenses are separated by 65 millimeters, the view of each picture is offset by this separating distance. This difference of viewpoint is known as parallax. It is the parallax or difference in viewpoint which makes depth perception possible. When each eye records and transmits a slightly different viewpoint to the brain, the fusion of the two different images occurs and produces depth perception. Therefore, the two pictures of the subject must be viewed simultaneously, with each eye observing one of the pictures to obtain depth perception.

To accomplish this, it is the general practice to mount the two pictures taken by the stereoscopic camera on a slide in the form of transparencies, to adapt them for viewing in a special viewer, or for insertion in a projector to project them upon a screen. In both instances the pictures are magnified, but the magnification is to a much greater degree in projection than in the viewer. For comfortable viewing by either method, it is important that the two transparencies be accurately positioned on the slide for horizontal and vertical alignment and accurate spacing, the spacing varying slightly in accordance with the distance of the scene. For close-up subjects, the spacing of the transparencies on the slide must be approximately two millimeters less than for distant scenes, with an intermediate spacing for near scenes. Since projection of the picture produces greater magnification, any error in mounting of the two transparencies on the slide is likewise magnified to a greater degree. For this reason, accurate mounting of the transparencies is especially important in projection viewing, although it is necessary in either case for quality viewing.

It is therefore a general object of the present invention to provide an improved fixture for accurately mounting stereoscopic transparencies on a slide for use with either a stereoscopic viewer or projector.

Another object of the present invention is to provide an improved mounting fixture for stereoscopic slides in which the spacing of the transparencies on the slide may be readily varied to accommodate for differences in the distances of the subjects.

Another object of the present invention is to provide an improved fixture for mounting stereoscopic transparencies on a slide with adhesive tape.

Another object is to provide a fixture for mounting stereoscopic transparencies on a mask, with an improved arrangement for alignment the mask with the transparencies.

Another object is to provide an improved fixture for mounting stereoscopic transparencies on slides in which the sprocket holes of the transparencies are utilized for accurately aligning them.

A further object is to provide an improved fixture for accurately mounting stereoscopic transparencies on slides with a minimum requirement of skill on the part of the operator.

A further object is to provide an improved fixture for rapidly mounting stereoscopic transparencies on slides with great accuracy.

A still further object is to provide an improved mounting fixture for stereoscopic slides of simple and inexpensive construction but efficient and convenient in operation.

According to this invention an improved fixture is provided for mounting the two transparencies of a stereoscopic picture on a mask to form a slide for use with either a stereoscopic viewer or projector. The transparencies are attached to the mask by two strips of adhesive tape which are first positioned on the fixture with their adhesive surfaces exposed. The two transparencies are placed on these adhesive strips, and are located by means of axially slidable pins which register with sprocket holes in the transparencies to accurately position them. One set of pins is disposed on a slide which is movable relative to the fixture for the purpose of adjusting the spacing of the transparencies to conform to the distance at which the photographed subject was located from the camera. The mask to which the transparencies are to be attached is placed in a mask holder provided with guides for guiding it into the desired position on the fixture. The mask holder is thus placed on the fixture to accurately locate the openings of the mask relative to the transparencies carried by the fixture. As the mask holder is urged downwardly into the fixture it brings the mask into contact with the transparencies and the adhesive surface of the tape, causing the tape to securely attach the transparencies to the mask in the precise desired position. At the same time that the mask is being brought into contact with the transparencies and the adhesive tape, the pins holding the transparencies are forced downwardly by the mask holder, to disengage them from the sprocket holes and release the transparencies. The mask holder may then be withdrawn from the fixture to permit removal of the completed slide which may then be protected by glass or other suitable transparent material.

The foregoing and other objects of the invention, which will become apparent from the following detailed specification setting forth an illustrative embodiment, may be achieved by the particular construction depicted in and described in connection with the accompanying drawings, in which:

Figure 1 is a view in front elevation of the mounting fixture completely assembled;

Figure 2 is a plan view of the mounting fixture with the mask holder removed to illustrate the position of the adhesive tape and transparencies on the fixture;

Figure 3 is a view in left side elevation of the fixture shown in Figure 2;

Figure 4 is a view in right side elevation of the fixture shown in Figure 2;

Figure 5 is a view of the mask holder, with the mask assembled thereto, substantially in longitudinal vertical section taken through the center of the holder;

Figure 6 is a view of the mask holder substantially in vertical section taken along the plane represented by the line 6—6 in Figure 5;

Figure 7 is a bottom view of the mask holder shown in Figure 5 with the mask in position and partially broken away;

Figure 8 is a perspective view of a complete stereoscopic slide as assembled by the mounting fixture comprising the present invention;

Figure 9 is a plan view of the spacing template for measuring the spacing of the transparencies on the mask;

Figure 10:
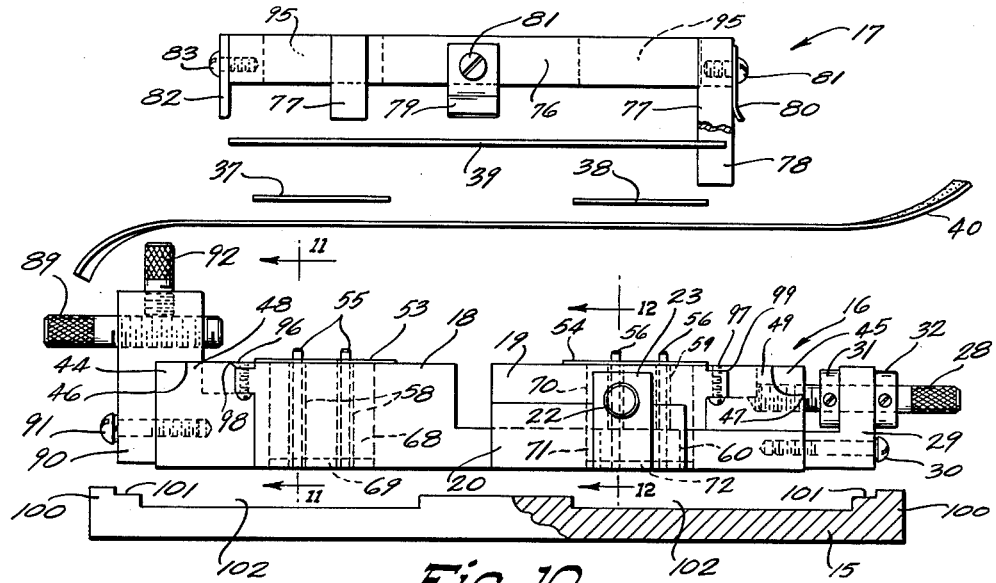
Figure 10 is an exploded view in front elevation of the mounting fixture and the several parts of the stereoscopic slide as they are applied to the fixture to be mounted.

Referring now more particularly to the drawings and specifically to Figure 1 thereof, the present invention is shown embodied in a mounting fixture comprising a clearance plate 15, an aligning mechanism generally denoted by the reference numeral 16, and a mask holder generally denoted by the reference numeral 17.

Figure 13:
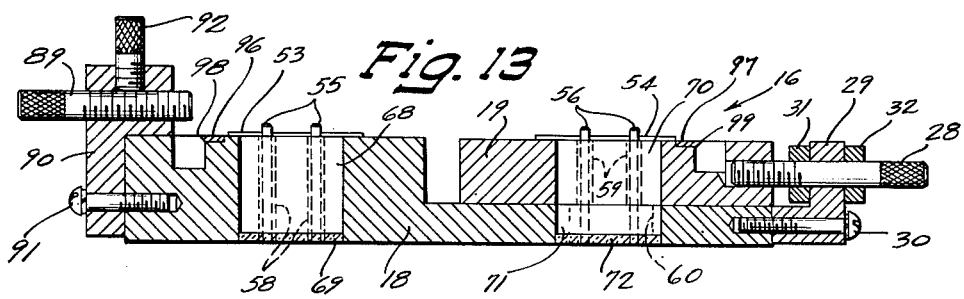
Figure 13 is a view in longitudinal vertical section taken generally along the plane represented by the line 13—13 in Figure 2.

The aligning mechanism 16 serves to bring the several parts of the stereoscopic slide into proper alignment and facilitate their assembly. It includes a base 18 upon which a slide 19 is slidably supported for longitudinal movement. It will be noted that the right side of the base 18 as viewed in Figure 13 is undercut to provide for the slide 19 so that the top surfaces of the base 18 and the slide 19 are in alignment.

The slide 19 is guided in its path of travel along the base 18 by a pair of guide plates 20 and 21 fixed to the sides of the base 18 to extend partially above its undercut portion on either side of the slide 19. The slide thus moves between the two guide plates 20 and 21 which serve to retain it in accurate alignment. The slide 19 is locked in position by a screw 22 threaded into an enlarged portion 23 of the guide plate 20 in position to bear against the side of the slide 19. After the slide is properly positioned on the base 18, the screw 23 is tightened to lock the slide between it and the guide 21.

Movement of the slide 19 is effected by rotating a lead screw 28 journalled in a bracket 29 and in threaded engagement with a tapped hole formed in the end of the slide 19. The bracket 29 is fixed to the end of the base 18 by a suitable screw 30 and includes an upwardly extending portion for receiving the screw 28. Axial movement of the lead screw 28 with respect to the bracket 29 is precluded by a pair of collars 31 and 32 which are locked on the screw 28 by set screws 33 on either side of the bracket 29 as clearly shown in Figure 1. Since the lead screw 28 is prevented from axial movement with respect to the bracket 29 and therefore the base 18, its rotation will cause movement of the slide 19 along the base 18 by reason of its threaded engagement therewith.

The completed stereoscopic slide shown in Figure 8 and generally denoted by the reference numeral 36 comprises a pair of transparencies 37 and 38 mounted on a mask 39 and fixed thereto by two strips of adhesive tape 40. The first step in mounting the transparencies 37 and 38 is to position the two strips of adhesive tape 40 across the base 18 and the slide 19 with their adhesive surfaces up. The end of the base 18 is formed to provide a pair of oppositely disposed lateral extensions 44, and the end of the slide 19 is likewise formed to provide a pair of similar lateral extensions 45.

The extensions 44 and 45 serve to properly position the adhesive tape 40 on the mounting fixture and to retain it in that position throughout the mounting procedure. In addition, the extensions 44 present knife edges 46, while the extensions 45 present knife edges 47 upon which the strips of adhesive tape 40 may be severed from the continuous roll (not shown) from which they are obtained.

The strips of adhesive tape 40 may, for example, be placed in position by grasping the continuous roll of tape (not shown) and placing its exposed edge under the lateral extension 44 and pressing the adhesive surface against the undersides of the extension 44 to cause the tape to adhere thereto. The tape is then threaded upwardly through a recess 48 formed in the base 18 and the stretched across the top surface of the base 18 and the slide 19 with its adhesive side up. It is then threaded downwardly through a recess 49 formed in the slide 19 and brought into contact with the underside of the extension 45 to cause it to adhere thereto. The strip 40 may then be severed from the continuous roll by the knife edge 47 so that it is neatly and efficiently positioned on the aligning mechanism 16. The same procedure is followed in positioning the other one of the two strips 40 which are then properly placed to enable completion of the mounting operation.

When the two strips of adhesive tape 40 are placed in position as above described, they will stretch across a pair of elongated elevations or ridges 53 formed on the base 18, and a similar pair of ridges 54 formed on the slide 19. These ridges present a bearing surface upon which pressure may be applied, in a manner to be later described, to render a tight bond between the adhesive tape 40, and the transparencies 37 and 38 and the mask 39 for the purpose of securely attaching the transparencies to the mask.

After the two strips of adhesive tape 40 have been positioned on the aligning mechanism 16, the transparencies 37 and 38 are placed thereon, and are accurately positioned by means of locating pins 55 and 56. A set of four of the pins 55 function to locate the transparency 37 while another set of four of the pins 56 serve to locate the transparency 38. The pins 55 and 56 are of a diameter corresponding to the dimensions of sprocket holes 57 formed in the transparencies by the film manufacturer for the purpose of providing a means for advancing the film in the camera.

Since the sprocket holes 57 are accurately dimensioned and spaced for proper operation, their presence in the transparencies 37 and 38 is taken advantage of in the present invention for accurately locating and positioning the transparencies on the aligning mechanism 16. This is accomplished by spacing the pins 55 and 56 in accordance with the spacing of the sprocket holes 57 on the transparencies so that two of the pins 55 may engage a pair of the sprocket holes 57 on top edge of the transparency 37 and the other two of the pins 55 may engage another pair of sprocket holes 57 on the bottom edge of the transparency 37. In like manner, the transparency 38 is positioned on the aligning mechanism 16 by engagement of its sprocket holes 57 with the pins 56.

With the sprocket holes 57 of the transparencies 37 and 38 thus embracing the pins 55 and 56, the transparencies are accurately positioned for vertical and horizontal alignment. In addition their edges extend onto the ridges 53 and 54 to overlap the adhesive tape 40 disposed thereon with its adhesive surface facing up.

Figure 11:
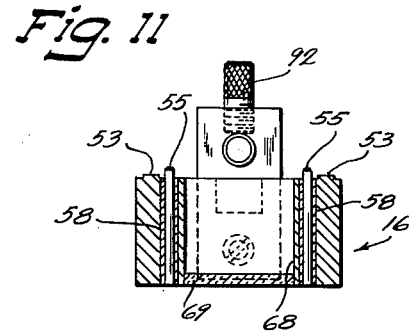
Figure 11 is a view in vertical section taken along the plane represented by the line 11—11 in Figure 10.
Figure 12:
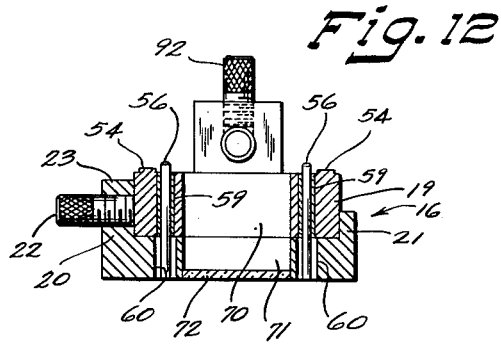
Figure 12 is a view in vertical section taken along the plane represented by the line 12—12 in Figure 10.

As clearly illustrated in Figures 11 and 12, the pins 55 are fitted in bushings 58 which are rigidly secured in the base 18. The pins 56 are likewise fitted in bushings 59 rigidly secured in the slide 19. The pins 55 and 56 are fitted in their respective bushings 58 and 59 for sliding movement therein upon the exertion of axial pressure upon them. With the pins 55 and 56 thus mounted for axial sliding movement, they may be forced downwardly when the transparencies 37 and 38 are fixed to the mask 39, as will be presently seen, to release the transparencies from the pins and facilitate removal of the completed stereoscopic slide 36 from the aligning mechanism 16.

As most clearly illustrated in Figure 12, the pins 56 are supported for axial movement in the slide 19, but extend downwardly through the base 18 to render their bottom ends accessible for the exertion of upward pressure upon them to move the pins into their upper position as depicted in Figure 12. Since the slide 19 is movable with respect to the base 18, the pins 56 are disposed in a pair of slots 60 formed in the base 18 to provide clearance for the pins and enable them to be moved laterally with the slide 19.

When the transparencies 37 and 38 are placed on the aligning mechanism 16 with their sprocket holes 57 in engagement with the pins 55 and 56, they are properly positioned for vertical and horizontal alignment. Their spacing, however, must be varied to conform with the distance of the subject of the picture to produce a quality stereoscopic slide for comfortable viewing. For close-up pictures the transparencies are a minimum distance apart, and for pictures taken at infinity they are a maximum distance apart while an intermediate spacing is desirable for near or average scenes. It is for this reason that the slide 19, bearing the transparency 38, is rendered movable relative to the base 18, to permit the adjustment of the spacing of the transparencies 37 and 38.

The spacing of the transparencies 37 and 38 will vary from a minimum distance of approximately sixty-three millimeters to a maximum distance of approximately sixty-five millimeters, depending upon the distance of the subject from the camera when the picture was taken. The operator may accurately space the transparencies 37 and 38 the desired distance with the aid of a template 65 illustrated in Figure 9.

The template 65 is fabricated of a transparent material such as plastic or glass. A base line 66 is scratched in the template on its left side as viewed in Figure 9, and serves as the base from which the measurements are taken. The right side of the template 65 is provided with a plurality of graduation lines 67, each of which is spaced a definite known distance from the base line 66. In the illustrated embodiment, four such graduation lines 67 are provided, spaced at intervals between sixty-three and sixty-five millimeters from the base line 66, it having been found that with these four graduation lines 67, the transparencies 37 and 38 may be accurately spaced to accommodate all conditions.

In operation, the template 65 is placed upon the transparencies 37 and 38 after they have been located on the aligning mechanism 16 by the locating pins 55 and 56. The width of the template 65 is in conformity with the spacing between the top and bottom rows of the pins 55 and 56 so that the template will fit between them. With this arrangement, the template will be properly positioned to effect the measuring operation.

With the template 65 located between the top and bottom rows of pins 55 and 56, a definite point in the picture is selected, and the base line 66 is placed to coincide with this point on the transparency 37. Since the transparency 38 is a picture of the same scene taken from a slightly different angle, the same point will appear on it. Therefore, with the template 65 held stationary, the lead screw 28 is rotated to move the slide 19, and therefore the transparency 38, to bring the selected point of the picture into coincidence with the proper one of the graduation marks 67.

For example, if the picture is a close-up, the proper spacing of the transparencies 37 and 38 is sixty-three millimeters, and the slide 19 would be moved to bring the selected point on the transparency 38 into coincidence with the first of the graduation lines 67, which is located the desired sixty-three millimeters from the base line 66 as indicated in Figure 9. In this manner, the desired spacing of the transparencies 37 and 38 for all conditions is readily obtained to produce a quality stereoscopic slide which may be viewed comfortably by projection, as well as in a viewer. After the transparencies have been properly spaced, the screw 22 is tightened to lock the slide 19 in position, and the template 65 is removed from the aligning mechanism 16.

In order to observe the selected point on the transparencies 37 and 38 for alignment with the base line 66 and the graduation lines 67, it is necessary to admit light to the underside of the transparencies. To this end the base 18 is provided with a rectangular opening 68 for admitting light from the bottom of the base 18 to the underside of the transparency 37 so that its picture may be readily observed for aligning the base line 66 of the template 65. To insure uniform lighting of the transparency 37 the bottom end of the opening 68 is closed by a piece of frosted glass 69 which is cemented in the opening for the purpose of diffusing the light as it enters.

In like manner, light is directed to the underside of the transparency 38 through an opening 70 formed in the slide 19, and an opening 71 formed in the base 18 to coincide with the opening 70, as most clearly illustrated in Figures 12 and 13. The light passing through the openings 71 and 70 is diffused by a piece of frosted glass 72 cemented in the bottom of the opening 71.

After the two strips of adhesive tape 40 and the transparencies 37 and 38 have been properly located on the aligned mechanism 16, it is only necessary to position the mask 39 to complete the stereoscopic slide 36. To this end, the mask holder 17 is provided for the purpose of properly locating the mask 39 with respect to the adhesive tape 40 and transparencies 37 and 38 disposed on the aligning mechanism 16.

As clearly illustrated in Figures 5 to 7 inclusive, the mask holder 17 comprises a plate 76 of approximately the same length and width as the mask 39. The plate 76 has a pair of guide members 77 fixed to one of its sides and another pair of guide members 78 attached to the opposite side.

The mask 39 is held in position against the bottom surface of the plate 76 by a pair of spring clips 79 and 80 attached to the plate 76 by suitable screws 81. The spring clip 79 is attached to the side of the plate 76 between the guide members 77 so that it functions to urge the mask 39 against the guide members 78. In like manner the spring clip 80 is mounted on the end of the plate 76 and serves to urge the mask 39 against an abutment 82 secured to the opposite end of the plate 76 by suitable screws 83. Thus, the mask 39 is properly positioned in the mask holder 17 both laterally and longitudinally, by reason of its abutment with the guide members 78 and the abutment 82 respectively, it being retained in abutment therewith by the spring clips 79 and 80. The guide members 77 are provided with recesses 84 as shown in Figure 6, furnishing clearance to accommodate variations which may exist in the width of the masks 39.

With the mask 39 in place in the mask holder 17, the latter is placed on the aligning mechanism 16 to bring the mask into position for assembly to the strips of adhesive tape 40, and transparencies 37 and 38. Lateral positioning of the mask holder 76, and the mask 39 carried by it, is achieved by means of the guide members 77 and 78. The space between the guide members 77 and the guide members 78 conforms to the width of the aligning mechanism 16, and to position the mask holder 17 laterally it is only necessary to place it on the aligning mechanism with the guide members 77 and 78 straddling the aligning mechanism.

When placing the mask holder 17 on the aligning mechanism it is first allowed to rest on the locating pins 55 and 56 while they are in their upper position as shown in Figures 10 and 13, no pressure being exerted on the mask holder to force the pins 55 and 56 downwardly to their lower position. Since the tops of the pins 55 and 56 extend above the strips of adhesive tape 40 and the transparencies 37 and 38, they serve to support the mask holder above these parts of the stereoscopic slide 36 without coming in contact with them.

With the mask holder thus supported directly above the transparencies 37 and 38, it may be conveniently adjusted longitudinally to center a pair of rectangular openings or windows 88 of the mask 39 with the transparencies 37 and 38. To facilitate this centering operation, a locating screw 89 is provided, being threaded in a bracket 90 which is secured to the left end of the aligning mechanism 16, as viewed in Figure 13, by a suitable screw 91. The end of the screw 89 is disposed to be abutted by the abutment 82 of the mask holder 17 so that it will contact the abutment 82 between its two mounting screws 83.

The centering of the openings 88 with the transparencies 37 and 38 may be best performed by urging the mask holder 17 toward the locating screw 89 to maintain its abutment 82 in contact therewith. The screw 89 is then rotated in either direction to center the opening 88 of the mask 39 with the transparencies 37 and 38. When proper alignment is obtained, the locating screw 89 may be locked in position by a locking screw 92 threaded vertically into the top of the bracket 90 in position to bear against the screw 89 and lock it in position when tightened to prevent its accidental movement.

Once a setting of the locating screw 89 has been established for a particular setting of the slide 19, it will serve as a locating point for the mask holder 17 without any further adjustment, for all subsequent stereoscopic slides to be mounted with the same setting of the slide 19. It is then only necessary to place the abutment 82 against the end of the locating screw 89 and the mask 39 will be properly positioned. When a picture which requires a change in the setting of the slide 19 is to be mounted, the locating screw 89 will have to be readjusted to center the openings 88 of the mask 39 with respect to the transparencies 37 and 38.

In centering the openings 88 with the transparencies 37 and 38 it is necessary to sight from the top of the mask holder 17. For this purpose, a pair of rectangular openings 95 are provided in the plate 76 of the mask holder 17. As best shown in Figure 7, the openings 95 are disposed crosswise of the openings 88 of the mask 39, and their length is somewhat greater than the width of the openings 88 so as to extend beyond their sides.

As previously described, the spacing of the transparencies 37 and 38 is varied in accordance with the distance of the subject of the picture. It is therefore also necessary to vary the spacing of the openings 88 of the mask 39 to produce a good stereoscopic slide 36. Although other arrangements may be provided, it has been found that by furnishing three different spacings of the openings 88 in the masks 39, all variations in the spacing of the transparencies 37 and 38 will be accommodated. Thus, one type of mask 39 will have a minimum spacing of the openings 88, a second will have these openings spaced a maximum distance, and the third will provide an intermediate spacing. And, with the length of the openings 95 in the plate 76 exceeding the width of the openings 88, as shown in Figure 7, all three types of masks will be provided for.

After the mask 39 is properly positioned with respect to the transparencies 37 and 38 as the mask holder 17 is resting on the tops of the pins 55 and 56 while they are in their upper position, a downward pressure is exerted on the mask holder 39, to force the pins 55 and 56 to slide downwardly in their respective bushings 58 and 59, to assume their lower position. The slight downward movement of the mask holder 17 will bring the mask 39 disposed therein into contact with the adhesive tape 40 and the transparencies 37 and 38, and the downward pressure exerted upon it will cause the mask 39 to bear firmly against the ridges 53 and 54 on the aligning mechanism 16. Such pressure on the ridges 53 and 54 is applied to those portions of the strips of adhesive tape 40 and transparencies 37 and 38 which overlie the ridges, to produce a tight bond between the adhesive tape and the mask and transparencies. This results in the transparencies 37 and 38 being securely attached to the mask 39 in exactly the proper position.

The downward movement of the pins 55 and 56 serves to release the transparencies 37 and 38 from their grasp at the same time that the mask 39 is brought into contact with the adhesive tape 40. However, the now completely assembled stereoscopic slide 36, is still attached to the aligning mechanism 16 by reason of the adherence of the ends of the strips of adhesive tape 40 to the underside of the lateral extensions 44 and 45.

The portions of the adhesive tape 40 which extend across the recesses 48 and 49 and into contact with the underside of the lateral extensions 44 and 45 is excess tape which extends beyond the limits of the mask 39. Its function is merely to hold the adhesive tape 40 in position while the stereoscopic slide 36 is being assembled, and after assembly is completed it is intended to be removed and discarded. To this end, as clearly seen in Figure 13, a cutter bar 96 is inserted to lie flush with the top surface of the base 18 at its outer end, and another cutter bar 97 is inserted to lie flush with the top surface of the slide 19 at its outer end. The cutter bars 96 and 97 present knife edges 98 and 99 respectively, disposed in approximate coincidence with the ends of the mask 39. To remove the excess portions of the adhesive tape 40, it is therefore only necessary to draw it downwardly across the knife edges 98 and 99 to sever it from that portion of the tape which remains attached to the mask 39.

When the pins 55 and 56 are forced into their downward position, their lower ends will extend beyond the bottom surface of the aligning mechanism 16. It is therefore necessary to provide clearance for their operation, and it is for this reason that the clearance plate 15 is provided. While assembling the stereoscopic slide 36 the aligning mechanism 16 is placed on the clearance plate 15 as depicted in Figure 1, resting between a pair of end flanges 100 on ledges 101 to provide clearance spaces 102 beneath the aligning mechanism 16 in position to furnish clearance for the operation of the pins 55 and 56.

After the stereoscopic slide 36 has been assembled, and the excess portions of the adhesive tape 40 have been severed, the mask holder 17 is removed from the aligning mechanism 16. The completed stereoscopic slide 36 will adhere to the mask holder 17 being held therein by the spring clips 79 and 80. It may then be conveniently removed from the mask holder, and if desired, placed between plates of protective glass or other similar transparent material in a well known manner. The aligning mechanism 16 may then be placed on a flat surface, such as the bottom of the clearance plate 15, and a downward pressure exerted upon it, to force the pins into their upper position again as shown in Figures 10 and 13, and render the fixture ready for the assembling of another stereoscopic slide 36.

To summarize the procedure for assembling a stereoscopic slide 36, reference is made to Figure 10 of the drawings, where the mounting fixture and the stereoscopic slide are shown in an exploded view in the order of their assembly. The aligning mechanism 16 is placed on the clearance plate 15, and the two strips of adhesive tape 40 are placed on the aligning mechanism 16 with their adhesive surfaces up. This is done by adhering one end of the adhesive tape 40 to the underside of one of the lateral extensions, as for example the lateral extension 44, and then threading it upwardly through the recess 48, drawing it across the top surface of the aligning mechanism 16, and then through the recess 49 into contact with the underside of the lateral extension 45.

With both strips of adhesive tape 40 thus in place, the transparency 37 is positioned on the base 18 by placing its sprocket holes 57 in engagement with the pins 55, and the transparency 38 is likewise positioned on the slide 19 by placing its sprocket holes 57 in engagement with the pins 56. If a spacing different from the spacing of the previous stereoscopic slide assembled on the fixture is necessary, the template 65 is placed on the aligning mechanism 16 between the opposing pairs of pins 55 and 56. The slide 19 is then adjusted by manipulating the lead screw 28 to obtain the desired spacing between the transparencies 37 and 38. The slide 19 is then locked in position by tightening the screw 22 and the template 65 is removed.

The mask 39 is placed in the mask holder 17 which is then placed on the aligning mechanism 16, resting on the pins 55 and 56 while they are in their upper position as shown in Figure 10. With the mask holder 17 resting on the pins 55 and 56, it is adjusted longitudinally by manipulating the locating screw 89 while urging the mask holder 17 into abutment with the end of the locating screw, such adjustment being performed to center the openings 88 of the mask 39 with the transparencies 37 and 38. When the adjustment of the mask holder 17 is completed, a downward pressure is exerted upon it, to force the pins 55 and 56 down, and bring the mask 39 into contact with the transparencies 37 and 38, and the two strips of adhesive tape 40, to bind the transparencies to the mask.

This completes the assembly of the stereoscopic slide 36, and the excess portions of the adhesive tape 40 may be severed by drawing the tape down against the knife edges 98 and 99. The mask holder 17 may then be removed from the aligning mechanism 16 and the completed stereoscopic slide will adhere to it from where it may be readily removed and placed in a protective covering if desired.

Although the teachings of the present invention have been illustrated as being embodied in a fixture for assembling a steresocopic slide having two transparencies, its features can obviously be applied for mounting a single transparency on a mask for two dimensional viewing. For example, this could be accomplished by eliminating the movable slide 19 and one of the openings in the mask holder 39 while reducing its size accordingly.

From the foregoing detailed description of the construction and mode of operation of the illustrative embodiment of the present invention, it will be apparent that a new and improved mounting fixture for assembling stereoscopic slides has been provided, with the fixture being especially adapted for rapid and convenient mounting of stereoscopic transparencies on a mask in pairs, with maximum accuracy for comfortable viewing in either a viewer or by projection.

Although the illustrative embodiment of the invention has been described in considerable detail for the purpose of making a full disclosure of a practical construction by means of which the invention may be practised, it is to be understood that various novel features of the invention may be incorporated in other arrangements without departing from the spirit and scope of the invention as defined in the subjoined claims.

The principles of the invention having now been fully explained in connection with the foregoing description of embodying structure, we hereby claim as our invention:

1. In a fixture for mounting the two pictures of a stereoscopic slide on a mask, a base, a slide movably mounted on said base, locating means on said base to locate one of said pictures thereon, locating means on said slide to locate the other of said pictures thereon in spaced relationship to the picture on the base, and guide means adapted to be placed on said base and said slide for accurately positioning the mask with respect to said pictures before securing the pictures to the mask.

2. In a fixture for mounting the two pictures of a stereoscopic slide on a mask, a base, a slide movably mounted on said base, locating pins mounted in said base in position to locate one of said pictures thereon, locating pins mounted on said slide in position to locate the other of said pictures thereon in spaced relationship to the picture on the base, and guide means adapted to be placed over said base and said slide for accurately positioning the mask with respect to said pictures before securing the pictures to the mask.

3. In a fixture for mounting the two pictures of a stereoscopic slide on a mask, a base presenting a first surface for receiving one of said pictures, a slide movably mounted on said base and presenting a second surface for receiving the other of said pictures, locating means on said base to locate the picture on said first surface, locating means on said slide to locate the picture on said second surface, and guide means adapted to be placed on said base and slide for accurately positioning the mask with respect to said pictures before securing the pictures to the mask.

4. In a fixture for mounting the two transparencies forming a stereoscopic slide on a mask, a base presenting a flat surface through a portion of its length for receiving one of said transparencies and a depressed portion through the remaining portion of its length, a slide movably mounted on said depressed portion and presenting a flat surface at the same level as the flat surface of said base for receiving the other of said transparencies, a set of locating pins extending through the flat surface of said base and adapted to engage sprocket holes formed in the transparencies for locating one of them on the base, a second set of locating pins extending through the flat surface of said slide and adapted to engage the sprocket holes of the transparencies for locating the second transparency on the slide, and guide means adapted to be placed upon said base and said slide for positioning the mask with respect to said transparencies before attaching the transparencies to the mask, whereby said locating pins will serve to accurately locate the transparencies for vertical and horizontal alignment, and the slide may be adjusted relative to said base to obtain the desired spacing of the transparencies.

5. In a fixture for mounting on a mask the two transparencies of a stereoscopic slide, a base presenting a surface for receiving one of said transparencies, a slide mounted for movement with respect to said base and presenting a surface for receiving the other of said transparencies, and a lock connected to lock the slide to the base, whereby the spacing of said transparencies may be adjusted by moving said slide relative to said base and the desired spacing maintained by locking the slide to the base.

6. In a fixture for assembling a stereoscopic slide comprising a pair of pictures mounted on a mask in coincidence with openings in the mask through which the pictures are viewed, a base, a slide mounted for movement with respect to said base, a set of locating pins mounted on said base in position to locate one of said transparencies thereon, a second set of locating pins mounted on said slide in position to locate the second of said transparencies thereon, and a mask holder adapted to hold the mask and fit over said base and slide to position the mask with respect to the transparencies thereon, whereby said transparencies are accurately aligned with respect to each other by said locating pins, and the mask is accurately located with respect to the transparencies by said mask holder preparatory to attaching the transparencies to the mask.

7. In a fixture for mounting a picture on a mask, a base presenting a surface for receiving the picture, a set of locating pins extending above said surface in position to locate the picture on the base, a mask holder adapted to hold the mask and fit over said base, and guide members on said mask holder to guide it into position on said base for aligning the mask with the picture, whereby the picture may be accurately aligned with respect to the mask before attaching it thereto.

8. In a fixture for mounting a picture on a mask, a base presenting a surface for receiving the picture, a set of locating pins extending above said surface in position to locate the picture on the base, a mask holder adapted to hold the mask and fit over said base, guide members depending from said mask holder to straddle the base when the mask holder is placed upon it for the purpose of positioning the mask holder laterally with respect to the picture on the base, and an abutment on said base to engage the end of said mask holder for positioning it longitudinally with respect to the picture on the base, whereby the picture may be accurately aligned with respect to the mask before attaching it thereto.

9. In a fixture for mounting a picture on a mask, a base presenting a surface for receiving the picture, tape retaining means on said base for retaining and locating two strips of adhesive tape thereon with its adhesive surface up, a set of axially slidable locating pins mounted in said base to selectively extend above said surface in position to locate the picture on the base with its ends overlying the tape, and a mask holder adapted to hold the mask and fit over the base to position the mask with respect to the picture thereon while resting on said upwardly extending pins out of contact with the picture and tape, whereby the picture may be accurately aligned with respect to the mask, and upon the attainment of proper alignment, a downward pressure may be applied to the mask holder to force the pins downwardly in the base and bring the mask into contact with the picture and tape to accurately and securely attach the picture to the mask by means of said tape.

10. In a fixture for assembling a stereoscopic slide comprising a pair of pictures mounted on a mask in coincidence with openings in the mask through which the pictures are viewed, a base presenting a surface for receiving one of said pictures, a slide mounted for movement relative to said base and presenting a surface for receiving the second of said pictures, a set of locating pins mounted on said base to extend above its picture receiving surface in position to locate the picture thereon, a second set of locating pins mounted on said slide to extend above its picture receiving surface in position to locate the picture thereon, and a mask holder adapted to hold the mask and fit over said base and slide to position the mask upon both of said surfaces and locate it with respect to the pictures thereon, whereby said pictures are accurately aligned with respect to each other by said locating pins, and the mask is accurately located with respect to the pictures by said mask holder preparatory to attaching the pictures to the mask.

11. In a fixture for assembling a stereoscopic slide comprising a pair of transparencies mounted on a mask in coincidence with openings in the mask through which the transparencies are viewed, a base, a slide mounted for movement with respect to said base, a set of locating pins mounted on said base in position to locate one of said transparencies thereon, a second set of locating pins mounted on said slide in position to locate the second of said transparencies thereon, a mask holder adapted to hold the mask and fit over the base and slide to position the mask with respect to the transparencies thereon, guide members depending from said mask holder to straddle the base and slide to locate the mask holder laterally with respect to the transparencies on the base and slide, and an abutment on said base in position to engage the end of said mask holder for locating it longitudinally with respect to the transparencies on the base and slide, whereby the transparencies may be accurately aligned with respect to the mask before attaching them thereto.

12. In a fixture for assembling a stereoscopic slide comprising a pair of transparencies mounted on a mask in coincidence with openings in the mask through which the transparencies are viewed, a base presenting a first surface for receiving one of said transparencies, a slide movably mounted on said base and presenting a second surface for receiving the second of said transparencies, said second surface being disposed in substantially the same plane as said first surface, tape retaining means on said base and said slide for retaining and locating two strips of adhesive tape across both of said surfaces with its adhesive surface up, and a mask holder adapted to hold the mask and fit over said base and slide to position the mask with respect to the transparencies and tape disposed on said surfaces, whereby the transparencies may be placed on said surfaces with their ends overlying the tape positioned thereon, and the mask may be brought into contact with the transparencies and tape by positioning said mask holder to attach the transparencies to the mask by means of said tape.

13. In a fixture for assembling a stereoscopic slide comprising a pair of transparencies mounted on a mask in coincidence with openings in the mask through which the transparencies are viewed, a base presenting a first surface for receiving one of said transparencies, a slide movably mounted on said base and presenting a second surface in substantially the same plane as said first surface is located for receiving the other of said transparencies, a first pair of lateral extensions fixed to the end of said base for retaining and locating the ends of two strips of tape extending across both of said surfaces with its adhesive surface up, a second pair of lateral extensions fixed to the end of said base for retaining and locating the opposite ends of said two strips of tape, locating pins mounted on said base to extend above said first surface for locating the transparency thereon for vertical and horizontal alignment with its ends overlying the two strips of tape, locating pins mounted on said slide to extend above said second surface for locating the transparency thereon for vertical and horizontal alignment with its ends overlying the two strips of tape, and a mask holder adapted to hold the mask and fit over said base and slide to position the mask with respect to the transparencies and tape disposed on said surfaces, whereby the transparencies may be placed on said surfaces with their ends overlying the tape positioned thereon, and the mask may be brought into contact with the transparencies and tape by positioning said mask holder to attach the transparencies to the mask by means of said tape.

14. In a fixture for assemblying a stereoscopic slide comprising a pair of transparencies mounted on a mask in coincidence with openings in the mask through which the transparencies are viewed, a base presenting a first surface for receiving one of said transparencies, a slide movably mounted on said base and presenting a second surface in substantially the same plane as said first surface is located for receiving the other of said transparencies, a first pair of lateral extensions fixed to the end of said base for retaining and locating the ends of two strips of tape extending across both of said surfaces with its adhesive surface up, a second pair of lateral extensions fixed to the end of said base for retaining and locating the opposite ends of said two strips of tape, locating pins mounted on said base to extend above said first surface for locating the transparency thereon for vertical and horizontal alignment with its ends overlying the two strips of tape, locating pins mounted on said slide to extend above said second surface for locating the transparency thereon for vertical and horizontal alignment with its ends overlying the two strips of tape, a mask holder adapted to be placed upon said base and slide, spring clips mounted on said mask holder to hold the mask in position to come into contact with the transparencies and tape located on said surfaces when the mask holder is placed upon said base and slide, guide members depending from said mask holder to straddle the base and slide and thereby locate the mask holder laterally with respect to the transparencies on said surfaces, and an adjustable abutment on said base in position to engage the end of said mask holder for locating it longitudinally with respect to the transparencies on said surfaces, whereby the transparencies may be placed on said surfaces with their ends overlying the tape positioned thereon, and the mask holder may be positioned upon said base and slide to bring the mask into contact with the transparencies and tape to attach the transparencies to the mask by means of said tape.

15. In a fixture for assembling a stereoscopic slide comprising a pair of transparencies mounted on a mask in coincidence with openings in the mask through which the transparencies are viewed, a base presenting a first surface for receiving one of said transparencies, a slide movably mounted on said base and presenting a second surface for receiving the second of said transparencies, said second surface being disposed in substantially the same plane as said first surface, tape retaining means on said base and said slide for retaining and locating two strips of adhesive tape across both of said surfaces with its adhesive surface up, and guide means adapted to be placed on said base and slide for accurately guiding the mask onto said surfaces to position it with respect to the transparencies and tape disposed on said surfaces, whereby the transparencies may be placed on said surfaces with their ends overlying the tape positioned thereon, and the mask may be brought into contact with the transparencies and tape to attach the transparencies to the mask in the proper position by means of said tape.

16. In a fixture for assembling a stereoscopic slide comprising a pair of transparencies mounted on a mask in coincidence with openings in the mask through which the transparencies are viewed, a base presenting a first surface for receiving one of said transparencies, a slide movably mounted on said base and presenting a second surface for receiving the second of said transparencies, said second surface being disposed in substantially the same plane as said first surface, tape retaining means on said base and said slide for retaining and locating two strips of adhesive tape across both of said surfaces with its adhesive surface up, locating pins mounted on said base to extend above said first surface for locating the transparency thereon for vertical and horizontal alignment with its ends overlying the two strips of tape, locating pins mounted on said slide to extend above said second surface for locating the transparency thereon for vertical and horizontal alignment with its ends overlying the two strips of tape, and a mask holder adapted to hold the mask and fit over said base and slide to position the mask with respect to the transparencies and tape disposed on said surfaces, whereby the transparencies may be located on said surfaces with their ends overlying the tape positioned thereon, and the mask may be brought into contact with the transparencies and tape by positioning said mask holder to attach the transparencies to the mask by means of said tape.

17. In a fixture for assembling a stereoscopic slide comprising a pair of pictures mounted on a mask in coincidence with openings in the mask through which the pictures are viewed, a base presenting a first surface for receiving one of said pictures, a slide movably mounted on said base and presenting a second surface for receiving the second of said pictures, said second surface being disposed in substantially the same plane as said first surface, tape retaining means on said base and said slide for retaining and locating two strips of adhesive tape across both of said surfaces with its adhesive surface up, a set of axially slidable locating pins mounted on said base to selectively extend above said first surface to locate the picture thereon for vertical and horizontal alignment with its ends overlying the tape, a second set of axially slidable locating pins mounted on said slide to selectively extend above said second surface to locate the picture thereon for vertical and horizontal alignment with its ends overlying the tape, a mask holder adapted to hold the mask and fit over the base and slide to rest upon the ends of said sets of axially slidable pins while in their upper position to place the mask adjacent to the pictures and tape but out of contact therewith, guide members depending from said mask holder to straddle the base and slide when the mask holder is resting upon said pins to position the mask holder laterally with respect to pictures on said surfaces, and an adjustable abutment on said base in position to engage the ends of said mask holder when it is resting on said pins for positioning it longitudinally with respect to the pictures on said surfaces, whereby the pictures may be accurately aligned with respect to the mask while the mask holder is resting on the pins out of contact with the pictures and tape, and upon the attainment of proper alignment, a downward pressure may be applied to the mask holder to force the pins downwardly into the base and slide and bring the mask into contact with the pictures and tape to accurately and securely attach the pictures to the mask by means of said tape.

References Cited in the file of this patent

UNITED STATES PATENTS

| | | |
|---|---|---|
| 1,142,956 | Greenberg et al. | June 15, 1915 |
| 2,055,175 | Franz | Sept. 22, 1936 |
| 2,430,365 | Polivka | Nov. 4, 1947 |
| 2,596,253 | Kurkjian | May 13, 1952 |
| 2,633,565 | Herzog | Mar. 31, 1953 |